United States Patent [19]

Schubart et al.

[11] Patent Number: 5,708,096

[45] Date of Patent: Jan. 13, 1998

[54] POLYMER COMPOUNDS AND THEIR USE FOR THE VULCANISATION OF HALOGEN-CONTAINING RUBBERS

[75] Inventors: Rüdiger Schubart; Rüdiger Musch, both of Bergisch Gladbach; Michael Happ, Dormagen, all of Germany

[73] Assignee: Bayer Aktiengesellschaft, Germany

[21] Appl. No.: 709,987

[22] Filed: Sep. 9, 1996

[30] Foreign Application Priority Data

Sep. 18, 1995 [DE] Germany ................ 195 34 621.1

[51] Int. Cl.⁶ .................................................. C08F 36/08
[52] U.S. Cl. .................................................. 525/333.1
[58] Field of Search ........................................ 525/333.1

[56] References Cited

U.S. PATENT DOCUMENTS 2,888,444  5/1959  Roberts et al. ................... 260/79.5
3,931,090  1/1976  Amatangelo ..................... 260/23.7 M
5,498,657  3/1996  Sugiyama et al. ............... 524/463

FOREIGN PATENT DOCUMENTS 0234205     9/1987   European Pat. Off. ..
0251760 A2  1/1988   European Pat. Off. ..
0251760 A3  1/1988   European Pat. Off. ..
784189     10/1957   United Kingdom .

*Primary Examiner*—Edward J. Cain
*Attorney, Agent, or Firm*—Connolly and Hutz

[57] ABSTRACT

The polymer compounds according to the invention, comprising special amidines, mercapto compounds and elastomers, are mainly suitable for the production of thermally stable, halogen-containing vulcanized rubbers. The vulcanized, halogen-containing rubbers obtained by means of the polymer compounds are distinguished by a reduced tendency to undergo unwanted subsequent vulcanization and are stable towards thermal and oxidative degradation at high storage temperatures.

18 Claims, No Drawings

POLYMER COMPOUNDS AND THEIR USE FOR THE VULCANISATION OF HALOGEN-CONTAINING RUBBERS

This invention relates to polymer compounds comprising amidines, mercapto compounds and polymers and to their use for the vulcanisation of halogen-containing rubbers. The vulcanised halogen-containing rubbers which are obtained by means of the polymer compounds are distinguished by a reduced tendency to undergo unwanted subsequent vulcanisation and are more stable towards thermal and oxidative degradation at high storage temperatures. In addition, the use of the said polymer compounds has a positive effect on the physical properties of the vulcanised rubbers.

As is known, polychloroprene can be vulcanised by treatment with diamines, diphenols, thioureas and/or metal oxides, for example. A distinction generally has to be made between sulphur-modified and non-sulphur-modified types. In the first-mentioned, the use of metal oxides alone is sufficient for the most part, whereas due to the reduced tendency of non-sulphur-modified polychloroprenes to undergo crosslinking the use of special vulcanisation accelerators is necessary, in addition to the metal oxides which are likewise necessary; see W. Hofmann, Vulkanisation & Vulkanisationshilfsmittel [*Vulcanisation & Vulcanisation Aids*], Verlag Berliner Union GmbH, Stuttgart 1965, page 274.

As metal oxides, zinc oxide is usually employed as a crosslinking agent and magnesium oxide is primarily employed as a chlorine acceptor. The use of zinc oxide on its own results in the more rapid commencement and completion of vulcanisation, but also results in insufficient crosslinking. The use of magnesium oxide on its own results in a more reliable processability, but unfortunately also results in the progress of vulcanisation being very slow and in very low degrees of vulcanisation. When zinc oxide and magnesium oxide are used simultaneously a synergistic vulcanisation effect is obtained, and a balanced combination of vulcanisation time and attainable degree of vulcanisation is achieved when a suitable mixture ratio is employed.

Despite this, the optimum degree of vulcanisation is not achieved, either for sulphur-modified or for non-sulphur-modified polychloroprenes. Rather, a gradually progressing subsequent crosslinking occurs, which must also be considered as the reason for the ageing behaviour of vulcanised polychloroprene rubbers which occurs preferentially under high thermal loading, particularly when they are subjected to dynamic stress in addition.

The resistance to ageing can be improved by the addition of anti-ageing agents based on diphenylamine, phenylenediamine, phenol, enol ethers or mercaptobenzoimidazole, although mercaptobenzoimidazole significantly reduces the storage stability of the unvulcanised mixture.

A process is also described in DE-A 39 42 463, according to which the stability of vulcanised polychloroprene rubbers is favourably influenced by the presence of amidines and of metal oxide which is free from magnesium oxide. The resulting vulcanised rubbers age less severely, which is manifested by a reduced fall-off in their mechanical properties. This process also has an unfavourable effect on the shelf life of mixtures, however, i.e. the time of commencement of vulcanisation and the scorch time become significantly shorter. This becomes particularly evident for mixtures which contain sulphur-modified polychloroprene.

Surprisingly, it has now been found that the addition of polymer-bonded blends of amidines and defined mercapto compounds significantly improves both the shelf life of the unvulcanised mixtures and the resistance to ageing of the vulcanised rubbers compared with the process described above. In addition, there is a beneficial effect on the property spectrum of the vulcanised rubbers.

The present invention therefore relates to polymer compounds consisting of
a) cyclic and/or acyclic amidines,
b) mercapto compounds of benzothiazole, benzoimidazole, benzopyrimidine and/or benzotriazine, and
c) ethylene/propylene rubbers (EP(D)M), ethylene-vinyl acetate rubbers (EVM), butadiene rubbers (BR), styrene-butadiene rubbers (SBR), natural rubbers (NR), butadiene-acrylonitrile rubber (NBR) and/or butyl rubbers (IIR).

wherein components a) and b) are present in the compound in a molar ratio of 0.25:1 to 2:1, preferably 0.5:1 to 1.5:1, and the proportion of polymer binder c) is 90 to 10% by weight, preferably 30 to 60% by weight, with respect to the total weight of components a) to c).

Amidines according to DE-A 3 942 463 may be used as cyclic or acylic amidines for the polymer compounds according to the invention, wherein compounds of general formulae III and IV described therein are preferred. The use of 1,8-diazabicyclo-(5.4.0)-undecene-(7) (DBU) or 1.5 diazabicyclo-(4.3.0)-nonene-(5) (DBN) is quite particularly preferred. The amidines may also of course be added in metered amounts in solid form, as adsorbates on organic or inorganic supports, e.g. kaolin, chalk or activated carbon.

Suitable mercapto compounds include mercapto compounds of benzothiazole, benzimidazole, benzopyrimidine and benzotriazine. Mercapto compounds of benzothiazole, benzoimidazole and 4,5-methylbenzoimidazole are preferably used, mercaptobenzimidazole and 4-methyl- or 5-methylmercaptobenzoimidazole being particularly preferred.

EP(D)M and EVM are particularly suitable as polymer components c).

Components a) to c) may be used both singly and in any mixtures with each other. If mixtures of amidines a), mercapto compounds b) or polymers c) with each other are used, the most favourable mixture ratio in each case can easily be determined by appropriate preliminary tests. The most favourable mixture ratio also depends on the desired property spectrum of the vulcanised rubbers to be produced.

The polymer compounds according to the invention may be produced in the usual manner by mixing components a) to c) in customary mixer units, such as internal mixers, extruders or rolls, wherein other rubber auxiliary materials or support materials, such as carbon black, chalk, kaolin, hydrated silica, softeners, colorants, biocides and/or vulcanisation accelerators may also be admixed with components a) to c). After mixing components a) to c) in the usual mixer units, the polymer compounds are subsequently converted into the appropriate customary standard forms, such as granules.

The present invention also relates to the use of the polymer compounds described above in the vulcanisation of halogen-containing rubbers, on their own or in combination with other rubbers. The polymer compounds according to the invention are used here in an amount of 0.1 to 20 parts by weight/100 parts by weight rubber.

Preferred halogen-containing rubbers which can be mixed with the polymer compounds according to the invention before vulcanisation include polychloroprene rubbers, chlorobutyl rubbers, bromobutyl rubbers, chlorinated polyethylene, chlorosulphonated and alkylated chlorosulphonated polyethylene and/or chlorinated polybutadiene, preferably polychloroprenes and chloro- and bromobutyl rubbers. These halogen-containing rubbers are known and are described, for example, in "The Synthetic Rubber Manual, 11th Edition, Internat. Institute of Synthetic Rubber Producers Inc., Houston/Tex." and "Ullmann's Encyclopedia of Industrial Chemistry, Vol. A23, 1993, 239–365".

According to the invention, the polymer compounds are mixed with the halogen-containing rubbers in the usual mixer units before vulcanisation. The preferred mixer units are the kneaders, rolls and mixer extruders which are customary in the rubber industry, which generally operate at shear rates of 1 to 1000 sec.$^{-1}$, preferably 1 to 200 sec.$^{-1}$.

Vulcanisation may be effected at temperatures of 20° to 250° C., preferably 140° to 210° C., optionally under a pressure of 10 to 200 bar.

The vulcanised rubbers produced according to the invention can advantageously be used wherever high thermal loading and dynamic stress give rise to the risk of premature ageing, and therefore for axle boots, V-belts, toothed belts, conveyor belts, buffers, spring elements and radiator hoses, for example.

EXAMPLES

TABLE 1

Substances used for the preparation of the examples according to the invention and of the comparative examples.

| Substances used | Specific material used[1] |
|---|---|
| 1,8-diaza-bicyclo (5.4.0)-undecene-(7) | DBU |
| 4/5-methylmercaptobenzoimidazole (mixture) | Vulkanox MB 2 |
| 2-mercaptobenzothiazole | Vulkacit Merkapto |
| EPDM polymer | EPDM 227 |
| | EPDM 345 |
| | AP 147 |
| EPM polymer | EPM 306 |
| EVM polymer | Levapren 700 HV |
| | Levapren 452 K |

TABLE 1-continued

Substances used for the preparation of the examples according to the invention and of the comparative examples.

| Substances used | Specific material used[1] |
|---|---|
| polychloroprene - sulphur type | Baypren 611 |
| | Baypren 510 |
| polychloroprene - general purpose type | Baypren 210 |
| chlorobutyl polymer | Chlorbutyl 1240 |
| bromobutyl polymer | Brombutyl 2030 |
| polybutadiene | CB11 |
| styrene-butadiene rubber | Krylene 1500 |
| natural rubber | TSR S Defo 700 |
| butyl rubber | Butyl 402 |

[1] Commercial and consumer products of Bayer AG and its subsidiary companies, apart from natural rubber.

Production of the compounds
Batch Process:

The polymer was first masticated on a roll mill which could be cooled, at 40° C., at a friction of 1:1.2 (20:24 rpm) and at a roll gap of 0.4 mm, until a complete rolled sheet was formed. Thereafter, the mercapto compound and then the amidine were added and mixed in. After both substances had been uniformly distributed, the rolled sheet was drawn out thinly and the material was comminuted. The batches produced in this manner are summarised as Nos. D–P in Table 2.

Continuous Production:

The 3 components were continuously added at temperatures up to 100° C. to a twin-shaft continuous screw Type ZSK 32 operating at 60 rpm, which had a nozzle outlet, and were discharged as a continuous length via the nozzle. The length of product was cooled with nitrogen, granulated, and lightly dusted with french chalk. The compounds produced in this manner are listed as Examples A–C in Table 2.

TABLE 2

Examples according to the invention

| No. | Polymer | Amount g | Mercapto compound | Amount in g/mole | Amidine | Amount in g/mole |
|---|---|---|---|---|---|---|
| A | Levapren 452 K | 1500 | Vulkanox MB2 | 360/2.1 | DBU | 300/1.9 |
| B | Levapren 452 K | 900 | Vulkanox MB2 | 1100/6.6 | DBU | 480/3.1 |
| C | Levapren 700 HV | 900 | Vulkanox MB2 | 1100/6.6 | DBU | 360/2.3 |
| D | Levapren 700 HV | 90 | Vulkacit Mercapto | 60/0.36 | DBU | 48/0.31 |
| E | EPDM 227 | 100 | Vulkanox MB2 | 50/0.30 | DBU | 50/0.32 |
| F | EPM 306 | 100 | Vulkanox MB2 | 50/0.30 | DBU | 50/0.32 |
| G | AP 147 | 100 | Vulkanox MB2 | 50/0.30 | DBU | 50/0.32 |
| H | AP 147 | 80 | Vulkanox MB2 | 75/0.45 | DBU | 50/0.32 |
| | Levapren 452 K | 20 | | | | |
| I | AP 147 | 50 | Vulkanox MB2 | 75/0.45 | DBU | 50/0.32 |
| | Levapren 452 K | 50 | | | | |
| K | Ap 147 | 20 | Vulkanox MB2 | 75/0.45 | DBU | 50/0.32 |
| | Levapren 452 K | 80 | | | | |
| L | Levapren 452 K | 100 | Vulkanox MB2 | 75/0.45 | DBU | 50/0.32 |
| M | CB11 | 100 | Vulkanox MB2 | 75/0.45 | DBU | 50/0.32 |
| N | Krylene 1500 | 100 | Vulkanox MB2 | 75/0.45 | DBU | 50/0.32 |
| O | TSR S Defo 700 | 100 | Vulkanox MB2 | 75/0.45 | DBU | 50/0.32 |
| P | Butyl 402 | 100 | Vulkanox MB2 | 75/0.45 | DBU | 50/0.32 |

The advantages according to the invention compared with the prior art are illustrated below, with reference to standard formulations and formulations specific to various articles.

Mixture Production, Vulcanisation and Vulcanisation Testing (These were carried out following ISO Specification 2475-1975 (E).)

Before the actual production of the mixture, 1000 g polychloroprene were masticated for 6 minutes, the roll gap being adjusted so that a rolled product with a diameter of about 12 mm was formed. After mastication, 800 g of rubber were removed and stored for a minimum of 10 minutes and a maximum of 120 minutes.

Roll mill: 200×390 mm

Temperature: 45°–55° C.

Friction: 1:1.4 (24:34 rpm)

Before mixing was commenced, the roll mill used, which was set at 30° C., was heated to the given lower limit of the operating temperature by means of waste rubber.

The mixing sequence and times corresponded to the data given above. After a mixing time of 13 minutes, the rolled sheet was worked for 1 minute, comprising notching it on alternate sides (three times on the left and three times on the right), and was drawn six times through a roll gap of width 0.8 mm over a further 2 minutes, resulting in a total mixing time was 16 minutes.

The mixture was stored overnight before vulcanisation.

The test data were determined according to the corresponding DIN specifications for soft rubber and are summarised in Table 3.

TABLE 3

| Test standards for rubber workpieces: | | |
|---|---|---|
| Property | Units | DIN Test method |
| Polymer/mixture: | | |
| Mooney viscosity | MU* | 53523 |
| Mooney scorch | minutes | 53523 |
| Rheometer (Monsanto MDR 2000) | | 53529 |
| Properties of vulcanised rubber | | |
| Strength | MPa | 53504 |
| Elongation | % | 53504 |
| Modulus | MPa | 53504 |
| Hardness | Shore A | 53505 |
| Hot air ageing | various | 53508 |

*MU = Mooney units

Storage Stability of Mixtures and Vulcanised Rubbers (Table 4)

Compared with the standard formulation according to ISO 2475 (Example 1), a standard mixture which is free from MgO was not stable on storage, even on the addition of Vulkanox MB2 (Examples 3 and 4). The stabilising effect of DBU in Example 5 is negatively influenced again by the DBU/Vulkanox MB2 combination in Example 6.

The production of the batch according to the invention from DBU/Vulkanox MB2 and the addition of this batch to the mixture (Example 7) results here in a mixture (Example 7) which is considerably more stable on storage, as is apparent from the slower increase in Mooney viscosity and in the scorch times (MS-t5) at 120° C. and 130° C. At comparable storage stabilities (Examples 1, 2 and 7) the hot air ageing of the vulcanised rubbers is significantly improved by the compound according to the invention.

Efficacy of the Compounds According to the Invention in Vulcanised Polychloroprene Rubbers — effect of the polymer blend—(Table 5)

Compared with the comparative formulation (Example 8), the resistance to ageing, measured as the hot air ageing at 100° C., was significantly improved by the addition of compounds G–L (Examples 9–13). Vulcanised rubbers with a high or low modulus are wanted, depending on their area of application. This can be achieved by selecting the appropriate polymer blend. Thus compounds produced according to the invention which are based on nonpolar polymers such as EPM or EPDM result in rubber articles having a low modulus (Examples 9–11), whilst the addition of compounds based on polar polymers such as Levapren results in vulcanised rubbers which have higher moduli for a comparable ultimate elongation.

Effect of the Mercapto Compound/Amidine Compound Molar Ratio on the Properties of the Vulcanised Rubber (Table 6)

Another possible way of altering the mechanical properties, such as the modulus of the vulcanised rubber, for example, is achieved by varying the molar ratio of amidine to mercapto compound. If the proportion of amidine is increased at a constant proportion of mercapto compound, the modulus increases, as shown by Examples 16–18 with Levapren as the polymer and by Examples 9, 14 and 15 with EPDM as the polymer.

Effect of different polymers (Table 7)

Apart from EVM and EP(D)M, other polymers are also suitable for the production of the compounds according to the invention. As shown by the results of the investigations in Table 7, the amidines and mercapto compounds in combination with SBR, NR and IIR exhibit excellent efficacy against hot air ageing with good scorch behaviour (Examples 23–25).

Efficacy of the Compounds in Chlorobutyl Rubber (Table 8)

If MgO is removed from the comparative formulation in Example 26, there is a deterioration in ageing behaviour—measured as the hot air ageing at 150° C. and 170° C. (Example 27). The addition of the batch according to the invention in Examples 28 and 29 results in a significantly improved resistance to hot air, particularly as regards the increase in modulus.

Efficacy of the Compounds in Bromobutyl/Polychloroprene Mixtures—(Table 9)

Here also, the resistance to ageing of rubber materials produced using the comparative formulation (Example 30) is negatively influenced by the removal of MgO (Example 31), and is positively influenced by the replacement of MgO and Vulkanox MB by the compound according to the invention (Example 32).

TABLE 4a

Storage stability of mixtures and vulcanised rubbers

| No. | Units** | 1*⁾ | 2*⁾ | 3*⁾ | 4*⁾ | 5*⁾ | 6*⁾ | 7 |
|---|---|---|---|---|---|---|---|---|
| Formulation | | | | | | | | |
| Baypren | | 100 | 100 | 100 | 100 | 100 | 100 | 100 |
| stearic acid | | 0.5 | 0.5 | 0.5 | 0.5 | 0.5 | 0.5 | 0.5 |
| carbon black N 772 | | 30 | 30 | 30 | 30 | 30 | 30 | 30 |
| MgO paste | | 5.3 | 5.3 | — | — | — | — | — |
| Levapren 452 K | | — | 5 | — | — | — | — | — |
| Vulkanox MB2 | | — | — | — | 1.0 | — | 1.0 | — |
| DBU | | — | — | — | — | 1.0 | 1.0 | — |
| compound A | | — | — | — | — | — | — | 7.4 |
| ZnO | | 5.0 | 5.0 | 5.0 | 5.0 | 5.0 | 5.0 | 5.0 |
| Vulkacit NPV/C | | 0.5 | 0.5 | 0.5 | 0.5 | 0.5 | 0.5 | 0.5 |
| Mixture properties: | | | | | | | | |
| storage at room temperature and scorch behaviour ML – 1 + 4/100° C. | | | | | | | | |
| 0 days | [MU] | 53.4 | 48.2 | 51.7 | 69.0 | 49.3 | 52.4 | 47.2 |
| 7 days | [MU] | 56.2 | 49.9 | 76.8 | 97.0 | 52.6 | 63.0 | 48.8 |
| 14 days | [MU] | 56.6 | 50.5 | 197 | 135 | 55.7 | 68.5 | 52.8 |
| 21 days | [MU] | 57.4 | 52.4 | >200 | >200 | 59.4 | 74.7 | 53.4 |
| diff: 0–21 days | [MU] | 4.0 | 4.2 | >150 | >130 | 10.1 | 22.3 | 6.2 |
| MS-t5/120° C. | min | 10.3 | 10.3 | 5.6 | 5.9 | 8.9 | 7.9 | 10.6 |
| MS-t5/130° C. | min | 6.7 | 6.4 | 3.4 | 4.0 | 5.6 | 5.4 | 6.8 |

*⁾comparative example
**⁾units: denote parts by weight unless indicated otherwise.

TABLE 4b

Storage stability of mixtures and vulcanised rubbers

| No. | Units** | 1*⁾ | 2*⁾ | 3*⁾ | 4*⁾ | 5*⁾ | 6*⁾ | 7 |
|---|---|---|---|---|---|---|---|---|
| Formulation | | | | | | | | |
| Baypren | | 100 | 100 | 100 | 100 | 100 | 100 | 100 |
| stearic acid | | 0.5 | 0.5 | 0.5 | 0.5 | 0.5 | 0.5 | 0.5 |
| carbon black N 772 | | 30 | 30 | 30 | 30 | 30 | 30 | 30 |
| MgO paste | | 5.3 | 5.3 | — | — | — | — | — |
| Levapren 452 K | | — | 5 | — | — | — | — | — |
| Vulkanox MB2 | | — | — | — | 1.0 | — | 1.0 | — |
| DBU | | — | — | — | — | 1.0 | 1.0 | — |
| compound A | | — | — | — | — | — | — | 7.4 |
| ZnO | | 5.0 | 5.0 | 5.0 | 5.0 | 5.0 | 5.0 | 5.0 |
| Vulkacit NPV/C | | 0.5 | 0.5 | 0.5 | 0.5 | 0.5 | 0.5 | 0.5 |
| Properties of vulcanised rubber: | | | | | | | | |
| hot air ageing, 7 and 14 days at 100° C., standard bar S-2 Change in mechanical properties: | | | | | | | | |
| 7-day modulus increase | (%) | 83 | 94 | 63 | 14 | 41 | 20 | 7 |
| 7 day hardness increase | Shore A | 9 | 11 | 8 | 1 | 5 | 2 | 0 |
| 14-day modulus increase | (%) | 272 | 300 | 212 | 94 | 180 | 120 | 109 |
| 14-day hardness increase | Shore A | 15 | 18 | 12 | 7 | 11 | 9 | 5 |

*⁾comparative example

TABLE 5

Efficacy of the compounds according to the invention in vulcanised polychloroprene rubbers - effect of polymer blend -

| No. | Units | 8*) | 9 | 10 | 11 | 12 | 13 |
|---|---|---|---|---|---|---|---|
| Formulation (ISO 2475) | | | | | | | |
| Baypren 210 | | 100 | 100 | 100 | 100 | 100 | 100 |
| stearic acid | | 0.5 | 0.5 | 0.5 | 0.5 | 0.5 | 0.5 |
| carbon black N 772 | | 30 | 30 | 30 | 30 | 30 | 30 |
| zinc white RS | | 5.0 | 5.0 | 5.0 | 5.0 | 5.0 | 5.0 |
| Vulkacit NPV/C | | 0.5 | 0.5 | 0.5 | 0.5 | 0.5 | 0.5 |
| MgO paste | | 5.3 | — | — | — | — | — |
| compound polymer-based) | | | | | | | |
| G (EPDM) | | — | 4.5 | — | — | — | — |
| H (EPDM/EVM = 80/20) | | — | — | 4.5 | — | — | — |
| I (EPDM/EVM = 50/50) | | — | — | — | 4.5 | — | — |
| K (EPDM/EVM = 20/80) | | — | — | — | — | 4.5 | — |
| L( EVM) | | — | — | — | — | — | 4.5 |
| Mixture properties | | | | | | | |
| MS-t5/120° C. | [min] | 10.1 | 9.2 | 9.1 | 9.6 | 9.8 | 9.8 |
| MS-t5/130° C. | [min] | 6.6 | 6.0 | 6.2 | 6.2 | 6.1 | 6.2 |
| Monsanto MDR 2000/150° C. | | | | | | | |
| $t_{10}$ | [min] | 3.1 | 2.2 | 2.2 | 2.3 | 2.3 | 2.3 |
| $t_{80}$ | [min] | 19.7 | 17.0 | 17.5 | 17.4 | 17.6 | 17.5 |
| $t_{90}$ | [min] | 29.7 | 26.4 | 27.0 | 26.8 | 27.3 | 26.9 |
| Properties of vulcanised rubber: standard bar S-2 heating time: 150° C./t90 + 5 min | | | | | | | |
| tensile strength | [MPa] | 21.9 | 23.1 | 23.1 | 23.2 | 23.9 | 24.1 |
| ultimate elongation | [%] | 379 | 503 | 488 | 500 | 501 | 493 |
| modulus S100 | [MPa] | 2.4 | 2.6 | 2.6 | 2.6 | 2.7 | 2.7 |
| modulus S200 | [MPa] | 6.7 | 6.3 | 6.2 | 6.3 | 6.6 | 6.7 |
| modulus S300 | [MPa] | 15.2 | 12.8 | 12.8 | 13.1 | 13.5 | 13.8 |
| 23° C. hardness | [Shore A] | 60.0 | 64 | 64 | 65 | 64 | 64 |
| Hot air ageing at 100° C.: standard bar S-2 | | | | | | | |
| 7-day modulus increase | [%] | 136 | 23 | 26 | 15 | 14 | 14 |
| 7-day hardness increase | [Shore A] | 12 | 1 | 1 | 0 | 0 | 1 |
| 14-day modulus increase | [%] | 347 | 119 | 119 | 107 | 118 | 96 |
| 14-day hardness increase | [Shore A] | 20 | 9 | 9 | 7 | 8 | 7 |
| 21-day modulus increase | [%] | 618 | 203 | 196 | 189 | 181 | 177 |
| 21-day hardness increase | [Shore A] | 25 | 11 | 11 | 10 | 11 | 10 |

*)comparative example

TABLE 6

Efficacy of the compounds in polychloroprene - variation of mercapto/amidine molar ratio -

| No. | Units | 8*) | 14 | 15 | 16 | 17 | 18 | 19 |
|---|---|---|---|---|---|---|---|---|
| Formulation | | | | | | | | |
| Baypren 210 | | 100 | 100 | 100 | 100 | 100 | 100 | 100 |
| stearic acid | | 0.5 | 0.5 | 0.5 | 0.5 | 0.5 | 0.5 | 0.5 |
| carbon black N 772 | | 30 | 30 | 30 | 30 | 30 | 30 | 30 |
| MgO paste | | 5.3 | — | — | — | — | — | — |
| compound F | | — | 4.0 | — | — | — | — | — |
| compound E | | — | — | 4.0 | — | — | — | — |
| compound C | | — | — | — | 6.5 | — | — | — |
| compound A | | — | — | — | — | 7.4 | — | — |
| compound B | | — | — | — | — | — | 5.1 | — |
| compound D | | — | — | — | — | — | — | 5.1 |
| zinc white RS | | 5.0 | 5.0 | 5.0 | 5.0 | 5.0 | 5.0 | 5.0 |
| Vulkacit NPV/C | | 0.5 | 0.5 | 0.5 | 0.5 | 0.5 | 0.5 | 0.5 |
| Mixture properties | | | | | | | | |
| MS-t5/120° C. | [min] | 10.1 | 8.0 | 8.3 | 8.2 | 10.6 | 8.4 | 8.0 |

TABLE 6-continued

Efficacy of the compounds in polychloroprene
- variation of mercapto/amidine molar ratio -

| No. | Units | 8*) | 14 | 15 | 16 | 17 | 18 | 19 |
|---|---|---|---|---|---|---|---|---|
| MS-t5/130° C. | [min] | 6.6 | 5.7 | 5.6 | 5.6 | 6.8 | 5.7 | — |
| Monsanto MDR 2000/150° C. | | | | | | | | |
| $t_{10}$ | [min] | 3.1 | 2.3 | 2.3 | 1.9 | 2.5 | 2.1 | 2.4 |
| $t_{80}$ | [min] | 19.7 | 19.2 | 19.1 | 14.8 | 17.7 | 15.4 | 15.1 |
| $t_{90}$ | [min] | 29.7 | 29.6 | 29.5 | 24.6 | 27.0 | 24.5 | 24.0 |
| F | [dNm] | 16.0 | 12.8 | 12.6 | 7.9 | 11.0 | 9.1 | 10.5 |
| Properties of vulcanised rubber: standard bar S-2 heating time: 150° C./t90 + 5 min | | 9.I | | | | | | |
| tensile strength | [MPa] | 21.9 | 24.5 | 24.8 | 25.0 | 23.8 | 25.5 | 22.8 |
| ultimate elongation | [%] | 379 | 475 | 475 | 634 | 485 | 566 | 410 |
| modulus S100 | [MPa] | 2.4 | 3.0 | 2.9 | 2.7 | 2.4 | 2.6 | 2.5 |
| modulus S200 | [MPa] | 6.7 | 7.2 | 7.3 | 6.0 | 6.1 | 5.9 | 6.0 |
| modulus S300 | [MPa] | 15.2 | 14.4 | 14.5 | 10.8 | 13.0 | 11.2 | — |
| 23° C. hardness | [Shore A] | 60.0 | 64.4 | 62.8 | 64.8 | 61.2 | 63.6 | 63.4 |
| Hot air ageing at 100° C.: standard bar S-2 | | | | | | | | |
| 7-day modulus increase | [%] | 136 | 24 | 30 | 4 | 7 | 6 | — |
| 7-day hardness increase | [Shore A] | 12 | 2 | 3 | 0 | 0 | 0 | — |
| 14-day modulus increase | [%] | 347 | 118 | 127 | 55 | 109 | 69 | 110 |
| 14-day hardness increase | [Shore A] | 20 | 9 | 10 | 4 | 5 | 5 | 7 |
| 21-day modulus increase | [%] | 618 | 196 | 205 | 122 | 204 | 126 | 140 |
| 21-day hardness increase | [Shore A] | 25 | 13 | 14 | 9 | 13 | 10 | 11 |

*)comparative example

TABLE 7

Efficacy of the compounds in polychloroprene
- different polymer supports -

| No. | Units | 8*) | 20 | 21 | 22 | 23 | 24 | 25 |
|---|---|---|---|---|---|---|---|---|
| Formulation (ISO 2475) | | | | | | | | |
| Baypren 210 | | 100 | 100 | 100 | 100 | 100 | 100 | 100 |
| stearic acid | | 0.5 | 0.5 | 0.5 | 0.5 | 0.5 | 0.5 | 0.5 |
| carbon black N 772 | | 30 | 30 | 30 | 30 | 30 | 30 | 30 |
| zinc white RS | | 5.0 | 5.0 | 5.0 | 5.0 | 5.0 | 5.0 | 5.0 |
| Vulkacit NPV/C | | 0.5 | 0.5 | 0.5 | 0.5 | 0.5 | 0.5 | 0.5 |
| MgO paste | | 5.3 | — | — | — | — | — | — |
| compound (polymer-based) | | | | | | | | |
| L (EVM) | | — | 4.5 | — | — | — | — | — |
| G (EPDM) | | — | — | 4.5 | — | — | — | — |
| M (BR) | | — | — | — | 4.5 | — | — | — |
| N (SBR) | | — | — | — | — | 4.5 | — | — |
| O (NR) | | — | — | — | — | — | 4.5 | — |
| P (IIR) | | — | — | — | — | — | — | 4.5 |
| Mixture properties | | | | | | | | |
| MS-t5/120° C. | [min] | 10.1 | 9.8 | 9.2 | 8.5 | 9.6 | 9.0 | 9.3 |
| MS-t5/130° C. | [min] | 6.6 | 6.2 | 6.0 | 6.1 | 7.2 | 7.0 | 7.1 |
| Monsanto MDR 2000/150° C. | | | | | | | | |
| $t_{10}$ | [min] | 3.1 | 2.3 | 2.2 | 2.3 | 2.1 | 2.2 | 2.2 |
| $t_{80}$ | [min] | 19.7 | 17.5 | 17.0 | 16.9 | 16.5 | 16.8 | 16.8 |
| $t_{90}$ | [min] | 29.7 | 26.9 | 26.4 | 26.4 | 25.7 | 26.2 | 26.0 |
| Properties of vulcanised rubber: standard bar S-2 heating time: 150° C./t90 + 5 min | | | | | | | | |
| tensile strength | [MPa] | 21.9 | 24.1 | 23.1 | 22.9 | 23.9 | 22.4 | 21.2 |
| ultimate elongation | [%] | 379 | 493 | 503 | 470 | 481 | 469 | 435 |
| modulus S100 | [MPa] | 2.4 | 2.7 | 2.6 | 2.8 | 2.8 | 2.9 | 2.9 |

TABLE 7-continued

Efficacy of the compounds in polychloroprene
- different polymer supports -

| No. | Units | 8*) | 20 | 21 | 22 | 23 | 24 | 25 |
|---|---|---|---|---|---|---|---|---|
| modulus S200 | [MPa] | 6.7 | 6.7 | 6.3 | 6.8 | 6.8 | 6.9 | 7.0 |
| modulus S300 | [MPa] | 15.2 | 13.8 | 12.8 | 13.6 | 13.5 | 13.4 | 13.7 |
| 23° C. hardness | [Shore A] | 60.0 | 64 | 64 | 65 | 65 | 65 | 65 |
| Hot air ageing at 100° C.: standard bar S-2 | | | | | | | | |
| 7-day modulus increase | [%] | 136 | 14 | 23 | 6 | 8 | 6 | 3 |
| 7-day hardness increase | [Shore A] | 12 | 1 | 1 | 0 | 0 | 0 | 0 |
| 14-day modulus increase | [%] | 347 | 96 | 119 | 75 | 42 | 75 | 75 |
| 14-day hardness increase | [Shore A] | 20 | 7 | 9 | 6 | 3 | 6 | 6 |
| 21-day modulus increase | [%] | 618 | 177 | 203 | 142 | 117 | 137 | 138 |
| 21-day hardness increase | [Shore A] | 25 | 10 | 11 | 11 | 8 | 11 | 11 |

*)comparative example

TABLE 8

Efficacy of the compounds in chlorobutyl
Example: Heat resistant formulation for conveyor belt covers based on chlorobutyl

| No. | Units | 26*) | 27*) | 28 | 29 |
|---|---|---|---|---|---|
| Formulation | | | | | |
| Chlorbutyl 1240 | | 80 | 80 | 80 | 80 |
| EPDM 345 | | 20 | 20 | 20 | 20 |
| stearic acid | | 2 | 2 | 2 | 2 |
| Maglite DE | | 1 | — | — | — |
| carbon black Corax N 347 | | 50 | 50 | 50 | 50 |
| Vulkanox DDA | | 1 | 1 | 1 | 1 |
| Ingralen 450 | | 10 | 10 | 10 | 10 |
| Cumerone resin B2-75P | | 10 | 10 | 10 | 10 |
| active zinc oxide | | 5 | 5 | 5 | 5 |
| Vulkacit DM/MG | | 1 | 1 | 1 | 1 |
| Vulkacit Thiuram/C | | 2 | 2 | 2 | — |
| compound E | | — | — | 4 | 4 |
| Mixture properties | | | | | |
| batch temperature | [°C.] | 92 | 86 | 84 | 84 |
| ML 1+4/100° C. | [MU] | 57.4 | 60.7 | 68.2 | 70.0 |
| MR | [%] | 5.6 | 5.8 | 6.1 | 6.3 |
| MS-t5/120° C. | [min] | 32.4 | 20.5 | 23.3 | >50 |
| Monsanto MDR 2000/170° C. | | | | | |
| ts01 | [min] | 1.6 | 1.0 | 2.2 | 3.1 |
| t$_{10}$ | [min] | 1.2 | 0.8 | 1.5 | 3.1 |
| t$_{80}$ | [min] | 4.3 | 2.0 | 13.8 | 26.5 |
| t$_{90}$ | [min] | 5.5 | 2.4 | 18.9 | 31.8 |
| Properties of vulcanised rubber: | | | | | |
| standard bar S-2 | [MPa] | 10.3 | 10.1 | 10.0 | 9.9 |
| heating time:170° C./t90 | [%] | 837 | 935 | 590 | 390 |
| tensile strength | [MPa] | 1.2 | 1.1 | 1.7 | 2.4 |
| ultimate elongation | [MPa] | 1.9 | 1.6 | 3.3 | 5.0 |
| modulus S100 | [MPa] | 3.2 | 2.6 | 5.3 | 7.8 |
| modulus S200 | [Shore A] | 61.2 | 59.8 | 66.9 | 70.4 |
| modulus S300 | | | | | |
| 23° C. hardness | | | | | |
| Hot air ageing at 150° C.: standard bar S-2 | | | | | |
| 1-day elongation decrease | [%] | 12 | 22 | 14 | 2 |
| 1-day modulus increase | [%] | 43 | 57 | 31 | 8 |
| 1-day hardness increase | Shore A | 9 | 9 | 7 | 6 |
| 3-day elongation decrease | [%] | 30 | 45 | 12 | 4 |
| 3-day modulus increase | [%] | 75 | 111 | 53 | 18 |
| 3-day hardness increase | Shore A | 13 | 15 | 11 | 9 |
| 5-day elongation decrease | [%] | 49 | 66 | 20 | 10 |
| 5-day modulus increase | [%] | 96 | 163 | 65 | 18 |
| 5-day hardness increase | Shore A | 15 | 17 | 12 | 11 |
| Hot air ageing at 170° C.: standard bar S-2 | | | | | |
| 1-day elongation decrease | [%] | 19 | 50 | 10 | 0 |
| 1-day modulus increase | [%] | 45 | 70 | 25 | 2 |
| 1-day hardness increase | Shore A | 11 | 10 | 9 | 6 |
| 3-day elongation decrease | [%] | 60 | 68 | 41 | 10 |
| 3-day modulus increase | [%] | 78 | 121 | 51 | 5 |
| 3-day hardness increase | Shore A | 15 | 17 | 12 | 10 |
| 5-day elongation decrease | [%] | 77 | 81 | 66 | 39 |
| 5-day modulus increase | [%] | 104 | 154 | 59 | 5 |
| 5-day hardness increase | Shore A | 17 | 18 | 13 | 10 |

*)comparative example

TABLE 9

Efficacy of compounds in bromobutyl-polychloroprene
Example: Drive belt formulation based on bromobutyl-polychloroprene

| No. | Units | 30*) | 31*) | 32 |
|---|---|---|---|---|
| Formulation | | | | |
| Brombutyl 2030 | | 25 | 25 | 25 |
| Baypren 611 | | 75 | 75 | 75 |
| stearic acid | | 1 | 1 | 1 |
| Maglite DE | | 3 | — | — |
| carbon black Statex N 330 | | 50 | 50 | 50 |
| Vulkanox DDA | | 2 | 2 | 2 |
| Sundex 790 | | 9 | 9 | 9 |
| Vulkanox MB2/MG | | 1 | 1 | — |
| active zinc oxide | | 5 | 5 | 5 |
| compound E | | — | — | 4 |
| Mixture properties | | | | |
| batch temperature | [°C.] | 84 | 84 | 85 |
| ML 1 + 4/100° C. | [MU] | 75.7 | 62.0 | 79.0 |
| MR | [%] | 12.8 | 10.4 | 14.7 |
| MS-t5/120° C. | [min] | 6.0 | 4.5 | 4.3 |
| Monsanto MDR 2000/170° C. | | | | |
| ts01 | [min] | 0.4 | 0.4 | 0.3 |
| t$_{10}$ | [min] | 0.6 | 0.5 | 0.4 |
| t$_{80}$ | [min] | 8.3 | 2.4 | 2.6 |

TABLE 9-continued

Efficacy of compounds in bromobutyl-polychloroprene
Example: Drive belt formulation based on bromobutyl-polychloroprene

| No. | Units | 30*⁾ | 31*⁾ | 32 |
|---|---|---|---|---|
| t₉₀ | [min] | 17.1 | 9.5 | 7.0 |
| Properties of vulcanised rubber: standard bar S-2 Heating time: 170° C./t90 | | | | |
| tensile strength | [MPa] | 21.3 | 23.6 | 22.3 |
| ultimate elongation | [%] | 288 | 405 | 310 |
| modulus S100 | [MPa] | 5.7 | 4.1 | 5.1 |
| modulus S200 | [MPa] | 14.5 | 11.0 | 13.7 |
| modulus S300 | [MPa] | — | 18.0 | 21.6 |
| 23° C. hardness | [Shore A] | 75.8 | 71.6 | 72.8 |
| Hot air ageing at 170° C.: standard bar S-2 | | | | |
| 1-day elongation decrease | [%] | 13 | 13 | 6 |
| 1-day modulus increase | [%] | 24 | 29 | 16 |
| 1-day hardness increase | [Shore A] | 4 | 4 | 2 |
| 3-day elongation decrease | [%] | 20 | 28 | 18 |
| 3-day modulus increase | [%] | 52 | 79 | 48 |
| 3-day hardness increase | [Shore A] | 7 | 8 | 6 |
| 5-day elongation decrease | [%] | 33 | 42 | 28 |
| 5-day modulus increase | [%] | 72 | 102 | 60 |
| 5-day hardness increase | [Shore A] | 10 | 11 | 8 |
| 7-day elongation decrease | [%] | 41 | 48 | 38 |
| 7-day modulus increase | [%] | 102 | 148 | 90 |
| 7-day hardness increase | [Shore A] | 12 | 14 | 10 |

*⁾comparative example

We claim:

1. Polymer compounds consisting of
   a) cyclic or acyclic amidines or a mixture thereof,
   b) mercapto compounds of benzothiazole, benzoimidazole, benzopyrimidine, benzotriazine or a mixture thereof, and
   c) ethylene/propylene rubbers (EPM), ethylene-propylene-diene rubbers (EPDM), ethylene-vinyl acetate rubbers (EVM), butadiene rubbers (BR), styrene-butadiene rubbers (SBR), natural rubbers (NR), butadiene-acrylonitrile rubber (NBR), butyl rubbers (IIR) or mixture thereof,
   wherein components a) and b) are present in the compound in a molar ratio of 0.25:1 to 2:1, and the proportion of polymer binder c) is 90 to 10% by weight with respect to the total weight of components a) to c).

2. The compounds as claimed in claim 1, wherein components a) and b) are present in the compound in a molar ratio of 0.5:1 to 1.5:1, and the proportion of polymer binder c) is 30 to 60% by weight with respect to the total weight of components a) to c).

3. The compounds as claimed in claim 1, wherein component a) is 1,8-diazabicyclo-(5.4.0)-undecene-(7) (DBU) or 1.5 diazabicyclo-(4.3.0)-nonene-(5) (DBN).

4. The compounds as claimed in claim 1, wherein component (b) is mercaptobenzimidazole or 4,5-methylbenzoimidazole.

5. A compound containing vulcanised halogen-containing rubber wherein the rubber contains the polymer compounds as claimed in claim 1.

6. A process which comprises vulcanising halogen-containing rubber wherein the rubber contains the polymer compounds as claimed in claim 1.

7. Polymer compounds comprising
   a) cyclic or acyclic amidines or a mixture thereof,
   b) mercapto compounds of benzothiazole, benzoimidazole, benzopyrimidine, benzotriazine, or a mixture thereof, and
   c) ethylene/propylene rubbers (EPM), ethylene-propylene-diene rubbers (EPDM), ethylene-vinyl acetate rubbers (EVM), butadiene rubbers (BR), styrene-butadiene rubbers (SBR), natural rubbers (NR), butadiene-acrylonitrile rubber (NBR), butyl rubbers (IIR), or a mixture thereof,
   wherein components a) and b) are present in the compound in a molar ratio of 0.25:1 to 2:1, and the proportion of polymer binder c) is 90 to 10% by weight with respect to the total weight of components a) to c).

8. The compounds as claimed in claim 7, wherein components a) and b) are present in the compound in a molar ratio of 0.5:1 to 1.5:1, and the proportion of polymer binder c) is 30 to 60% by weight with respect to the total weight of components a) to c).

9. The compounds as claimed in claim 7, wherein component a) is 1,8-diazabicyclo-(5.4.0)-undecene-(7) (DBU) or 1.5 diazabicyclo-(4.3.0)-nonene-(5) (DBN).

10. The compounds as claimed in claim 7, wherein component (b) is mercaptobenzimidazole or 4,5-methylbenzoimidazole.

11. A compound containing vulcanised halogen-containing rubber wherein the rubber contains the polymer compounds as claimed in claim 7.

12. A process which comprises vulcanising a halogen-containing rubber wherein the rubber contains the polymer compounds as claimed in claim 7.

13. Polymer compounds consisting essentially of:
   a) cyclic or acyclic amidines or a mixture thereof,
   b) mercapto compounds of benzothiazole, benzoimidazole, benzopyrimidine, benzotriazine, or a mixture thereof, and
   c) ethylene/propylene rubbers (EPM), ethylene-propylene-diene rubbers (EPDM), ethylene-vinyl acetate rubbers (EVM), butadiene rubbers (BR), styrene-butadiene rubbers (SBR), natural rubbers (NR), butadiene-acrylonitrile rubber (NBR), butyl rubbers (IIR) or a mixture thereof,
   wherein components a) and b) are present in the compound in a molar ratio of 0.25:1 to 2:1, and the proportion of polymer binder c) is 90 to 10% by weight with respect to the total weight of components a) to c).

14. The compounds as claimed in claim 13, wherein components a) and b) are present in the compound in a molar ratio of 0.5:1 to 1.5:1, and the proportion of polymer binder c) is 30 to 60% by weight with respect to the total weight of components a) to c).

15. The compound as claimed in claim 13, wherein component a) is 1,8-diazabicyclo-(5.4.0)-undecene-(7) (DBU) or 1.5 diazabicyclo-(4.3.0)-nonene-(5) (DBN).

16. The compounds as claimed in claim 13, wherein component (b) is mercaptobenzimidazole or 4,5-methylbenzoimidazole.

17. A compound containing vulcanised halogen-containing rubber wherein the rubber contains the polymer compounds as claimed in claim 13.

18. A process which comprises vulcanising a halogen-containing rubber wherein the rubber contains the polymer compounds as claimed in claim 13.

* * * * *